United States Patent
Kumar et al.

(10) Patent No.: US 10,026,113 B2
(45) Date of Patent: Jul. 17, 2018

(54) ONLINE MARKETPLACE TO FACILITATE THE DISTRIBUTION OF MARKETING SERVICES FROM A MARKETER TO AN ONLINE MERCHANT

(71) Applicant: Yahoo! Inc., Sunnyvale, CA (US)

(72) Inventors: Amit Kumar, San Jose, CA (US); Stephen Kemmerling, Mountain View, CA (US)

(73) Assignee: Excalibur IP, LLC, New York, NY (US)

( * ) Notice: Subject to any disclaimer, the term of this patent is extended or adjusted under 35 U.S.C. 154(b) by 683 days.

(21) Appl. No.: 14/078,137

(22) Filed: Nov. 12, 2013

(65) Prior Publication Data

US 2014/0143067 A1    May 22, 2014

Related U.S. Application Data

(60) Provisional application No. 61/725,279, filed on Nov. 12, 2012.

(51) Int. Cl.
*G06Q 30/02* (2012.01)
*G06Q 30/06* (2012.01)

(52) U.S. Cl.
CPC ..... *G06Q 30/0631* (2013.01); *G06Q 30/0275* (2013.01)

(58) Field of Classification Search
CPC ........... G06Q 30/0601; G06Q 30/0201; G06Q 30/00; G06Q 30/0641; G06Q 30/0277;
(Continued)

(56) References Cited

U.S. PATENT DOCUMENTS 7,685,028 B2 †   3/2010   Gross
8,423,405 B1 *   4/2013   Gopalratnam ......... G06Q 30/00
                                                        705/14.4

(Continued)

FOREIGN PATENT DOCUMENTS

CN   101896933 A   11/2010
CN   102033883 A    4/2011

OTHER PUBLICATIONS

Chinese Office Action issued in Application No. 102141005 dated Jun. 16, 2015.

(Continued)

*Primary Examiner* — Patricia H Munson
(74) *Attorney, Agent, or Firm* — Mauriel Kapouytian Woods LLP; Serge Krimnus; James Woods

(57) ABSTRACT

Methods and systems are provided for use, for example, in e-commerce. E-commerce data from a merchant may be received regarding interactions of customers with a website of the merchant. Characteristics of the e-commerce data may be identified. Based at least in part on the one or more identified characteristics, a plurality of marketing actions may be selected, or automatically selected, that are potentially effective for the merchant. The selected marketing actions may be ranked based at least in part on one or more of a quality score and one or more bids associated with each of the selected marketing actions. A ranked list of the selected marketing actions may be provided, or recommended, to the merchant.

22 Claims, 10 Drawing Sheets

(58) Field of Classification Search
CPC .......... G06Q 30/0256; G06Q 30/0251; G06Q 30/0241; G06Q 20/322
USPC ........................................... 705/14
See application file for complete search history.

(56) References Cited

U.S. PATENT DOCUMENTS

| | | | |
|---|---|---|---|
| 8,856,165 B1* | 10/2014 | Cierniak | G06Q 10/10 705/28 |
| 2003/0053615 A1 | 3/2003 | Anderson et al. | |
| 2005/0021416 A1* | 1/2005 | Anderson | G06Q 30/0613 705/26.41 |
| 2006/0253434 A1* | 11/2006 | Beriker | G06Q 30/0601 |
| 2006/0253468 A1* | 11/2006 | Ramsey | G06Q 10/0637 |
| 2009/0327083 A1 | 12/2009 | Mathew et al. | |
| 2011/0238504 A1* | 9/2011 | Aslam | G06Q 30/02 705/14.69 |
| 2012/0253903 A1 | 10/2012 | Tavares et al. | |
| 2012/0296697 A1* | 11/2012 | Kumar | G06O 30/02 705/7.29 |
| 2012/0316957 A1* | 12/2012 | Zhou | G06Q 30/0275 705/14.46 |

OTHER PUBLICATIONS

International Search Report and Written Opinion issued in International Patent Application No. PCT/US2013/069707 dated Mar. 13, 2013.
Office Action issued in Taiwanese Patent Application No. 102141005 dated Mar. 20, 2018, 12 pages.

* cited by examiner
† cited by third party

|  | Lexity Live | Live Archive | MailChip-ROI | Pinterest Report | Quick Chat | eComm-Hub | Shopping Feeds | Mix Rank | Google Shopping | Retargeting |
|---|---|---|---|---|---|---|---|---|---|---|
| Many first time customers | Y | N | N | N | N | Y | Y | Y | Y | N |
| Few returning customers | Y | N | N | Y | Y | N | Y | N | N | Y |
| Many impulse shoppers | Y | N | N | Y | N | Y | Y | Y | N | N |
| Many window shoppers | Y | N | Y | Y | Y | N | Y | Y | N | N |
| Few bargain shoppers | Y | N | N | N | Y | Y | Y | Y | Y | Y |
| Many last minute shoppers | Y | N | Y | Y | Y | Y | N | N | N | N |
| Many men in their forties | Y | Y | Y | N | Y | N | Y | Y | Y | Y |
| Many women in their forties | Y | N | N | N | Y | Y | Y | N | N | N |

Y = recommended marketing action

N = not recommended marketing action

FIG. 6

ONLINE MARKETPLACE TO FACILITATE
THE DISTRIBUTION OF MARKETING
SERVICES FROM A MARKETER TO AN
ONLINE MERCHANT

FIELD OF THE INVENTION

Some embodiments relate generally to the field of e-commerce systems and methods, and in particular, to providing an online marketplace for facilitating the distribution (e.g., sale) of advertising and/or marketing services, embodied as software (e.g., software applications), from marketer(s) to on-line merchant(s).

BACKGROUND

Advertising and marketing is central to any business, especially on-line businesses that do not have direct visible interaction with customers. Advertising usually begins with a product and an advertisement for that product. Traditional methods of advertising include television commercials, billboards, magazine ads and other sources that are likely to be browsed or viewed by the public.

On-line advertising, however, is different. An on-line business that markets or sells a product must have more than a product and potential customers. It must also have on-line visibility, that is, its on-line identity must be known and visible to a potential consumer. In today's digital world, people are spending more time on the Internet. Thus, often, an on-line business' most effective source for marketing its products and services is a captive audience on the World Wide Web. An e-commerce business that has identified a product, a target audience, and has procured a website for its business must now reach out to millions, if not billions of potential consumers that are rapidly searching the Internet, visiting websites, and conducting key word searches through popular search engines such as Google™, Yahoo!™, and Bing™.

There are several potential ways an on-line e-commerce business might find a target consumer.

First, the identity and corresponding uniform resource locator (URL) of the on-line business' website may already be known to the customer. For example, a user familiar with the Amazon™ shopping website might simply enter "www.Amazon.com" in a browser address field, which will take the consumer straight to the e-commerce website.

Second, the e-commerce business might show up in a search result or embedded advertising link on another webpage, related or unrelated, to the e-commerce business. To be displayed in a ranked search result, the e-commerce business may partner with services such as Google Ads or Yahoo! Ads and purchase certain key words related to its business in order draw an automatic association between a searched key word (phrase, etc.) and the corresponding e-commerce business, thus ensuring that the e-commerce business shows up in the displayed results of a search engine webpage. These services often employ a "click through" payment method which charges e-commerce businesses a certain dollar amount each time an Internet user clicks on the URL link of the subscribing e-commerce business.

Third, an e-commerce business may choose to buy "on-line real estate", that is advertise its products and services through some popular third party websites such as Facebook™, Groupon™, and home pages of sites such as CNN.com, NYTimes.com, etc. These sites may partner with e-commerce businesses and allow e-commerce ads to be placed on their sites or display pop-up ads when a user visits the site. This often involves significant time of a marketing department or employee to identify potential partnering websites and enter into agreements with the third parties to display ads on their sites.

Finally, some combination of the above methods may be used where an e-commerce business uses services such as Google or Yahoo! to purchase key words and define a relevant geography, product, and target consumer for its products and services, and also partners with third party sites to obtain on-line commercial real estate for e-commerce business advertisements. However, even with the current slate of options available to e-commerce businesses, e-commerce business owners must spend significant time, resources and capital in creating an advertising campaign, researching the appropriate search engines to use, defining a number of complex variables such as key words, target audience, geography, product category, products, product attributes, etc., and monitor and gather statistics on consumer behavior to determine what types of users and what types of sites are appropriate and effective for their advertisements.

Compounding this problem is the fact that user behavior, products, site content and key words and their associated back-end search engines are constantly evolving and changing. Small businesses often do not have the time or resources to hire graphic designers to create ads, marketing personnel to research and study effective sources and targets for advertising, and specialized information technology (IT) personnel that are familiar with third party advertising systems such as Google, Yahoo! and Bing™.

Recognizing the above-described problems, Lexity™ of Mountain View, Calif., has begun to provide e-commerce merchants with software encoding marketing actions that, when installed on a merchant website, generate and optimize advertisements/marketing for the merchant website. Lexity also provides software encoding marketing actions that, when installed on computer system(s) of the merchant, works "behind the scenes" managing advertising or providing information feedback to the merchants (e.g., via a Lexity user interface). Such marketing actions may be embodied as software applications (frequently referred to as "apps" in short). Lexity has developed a collection of such e-commerce applications, each application designed to optimize the merchant website in a specific way and/or configure computer system(s) of the merchant in a specific way (e.g., managing advertising of the merchant, providing feedback to the merchants, etc.). The inventors envision that in the near future, companies other than Lexity (i.e., "third-party marketers") may start designing software applications having a similar purpose of assisting on-line merchants with their marketing and advertising needs. With the influx of marketing applications from both Lexity and third-party marketers, merchants will need help selecting one or more marketing actions (e.g., software applications) that are best suited (e.g., help the e-commerce businesses maximize their profit) for their websites and/or computer systems. To address this need, the inventors have developed a marketplace that brings together marketers and merchants. An important feature of the marketplace is a recommendation engine that automatically recommends certain e-commerce applications to a merchant.

SUMMARY OF THE INVENTION

In one embodiment, a system is designed to intelligently recommend appropriate marketing actions to be taken by an e-commerce merchant based on that merchant's entire e-commerce data. Specifically, e-commerce data may comprise any and all data that is accumulated in the operation of an e-commerce store, including orders, website traffic data, the store's products, etc. This data may be leveraged by applying statistical methods and human expert generated heuristics to determine which marketing actions have the best chance of increasing the merchant's profit.

A marketing action could take one of several forms, including instructions for the merchant to carry out and a marketing software application. Recommended marketing actions may be presented to the merchant through various channels, including direct contact via e-mail (targeting merchants listed in a marketer's database) and various visual presentations in the user interface of e-commerce marketing applications the merchant already has installed. In addition, third-party marketers may bid for positions in the various channels through which the marketing recommendations are communicated. The bid price may be determined by other bids, by the bid position, as well as by a quality score (i.e., the better the system determines the recommendation to be for the merchant, the cheaper the bid price may be).

BRIEF DESCRIPTION OF THE DRAWINGS

Some embodiments will be more fully understood from the following detailed description thereof taken together with the accompanying drawings, in which:

FIG. 6 depicts an exemplary table that organizes a collection of rules mapping identified characteristics of e-commerce data to e-commerce applications, in accordance with one embodiment.

DETAILED DESCRIPTION

Embodiments are discussed below with reference to FIGS. 1-9. The figures are illustrative of certain embodiments of the invention and are not intended to limit the scope of the claimed invention.

Figure 1:
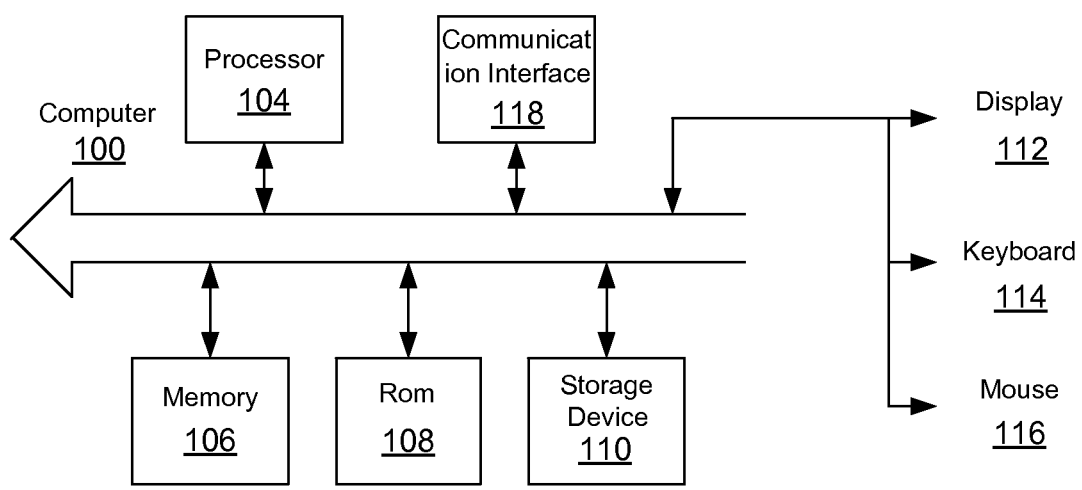
FIGS. 1 and 2 are examples of computer architectures for computer systems configured in accordance with embodiments.

FIG. 1 illustrates an example of a computer system 100 on which any of the methods and systems of various embodiments may be implemented. Computer system 100 may represent any of the computer systems and physical components necessary to perform the computerized methods discussed in connection with FIGS. 3-9 and, in particular, may represent a server, client or other computer system upon which e-commerce servers, websites, web browsers and/or web analytic applications may be instantiated. Computer system 100 may include a bus 102 or other communication mechanism for communicating information, and a processor 104 coupled with the bus 102 for processing information. Computer system 100 may also include a main memory 106, such as a RAM or other dynamic storage device, coupled to the bus 102 for storing information and instructions to be executed by processor 104. Main memory 106 also may be used for storing temporary variables or other intermediate information during the execution of instructions by processor 104. Computer system 100 may further include a ROM 108 or other static storage device coupled to the bus 102 for storing static information and instructions for the processor 104. A storage device 110, such as a hard disk, may also be provided and coupled to the bus 102 for storing information and instructions.

Computer system 100 may be coupled via the bus 102 to a display 112 for displaying information to a user, however, in the case of servers such a display may not be present and all administration of the server may be via remote clients. Likewise, input device 114, including alphanumeric and other keys, may be coupled to the bus 102 for communicating information and command selections to the processor 104, but such a device may not be present in server configurations. Another type of user input device is cursor control device 116, such as a mouse, a trackball, or cursor direction keys for communicating direction information and command selections to processor 104 and for controlling cursor movement on the display 112. Such an input device may or may not be present in a server configuration.

Computer system 100 may also include a communication interface 118 coupled to the bus 102. Communication interface 118 may provide for two-way, wired and/or wireless data communication to/from computer system 100, for example, via a local area network (LAN) or other network, including the Internet. Communication interface 118 may send and receive electrical, electromagnetic or optical signals, which carry digital data streams representing various types of information and instructions. For example, two or more computer systems 100 may be networked together in a conventional manner with each using a respective communication interface 118.

It will be appreciated that the recommendation engine and merchant website can be implemented in respective instantiations of computer system 100, by way of either a client machine, server machine, or some combination of servers, clients and other network devices known to one of ordinary skill in the art.

The various databases described herein are computer-based record keeping systems. Stated differently, these databases are each a combination of computer hardware and software that act together to allow for the storage and retrieval of information (data). Accordingly, they may resemble computer system 100, and are often characterized by having storage mediums capable of accommodating significant amounts of information.

Figure 2:
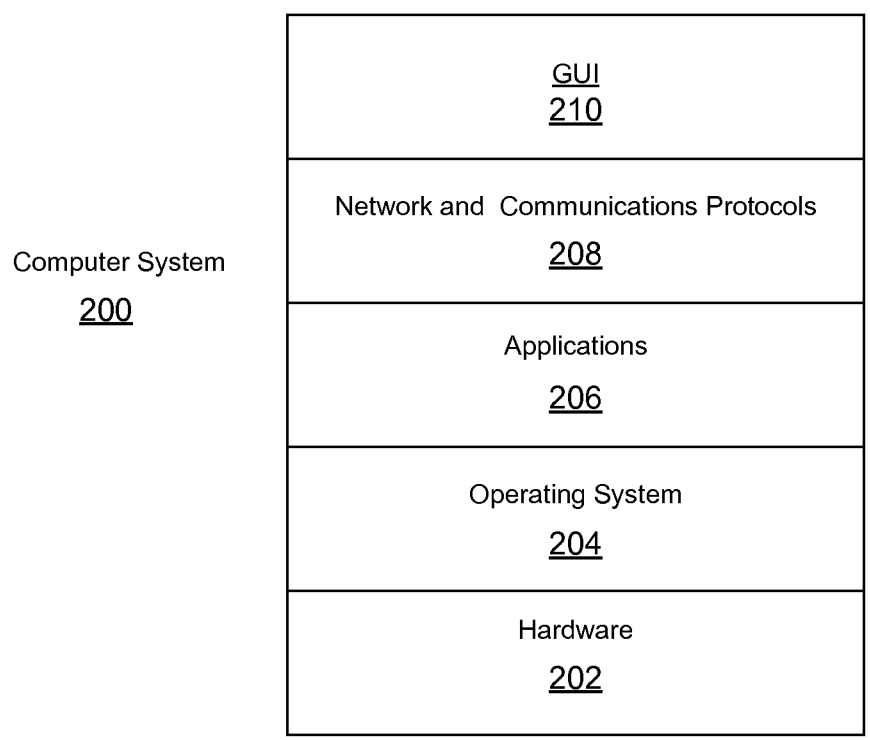

FIG. 2 illustrates a computer system 200 from the point of view of its software architecture, according to embodiments of the invention. Computer system 200 may be a server or a group of servers or computers. The various hardware components of computer system 200 are represented as a hardware layer 202. An operating system 204 abstracts the hardware layer and acts as a host for various applications in application layer 206. Network and communications protocols such as HTTP, HTTPS, SSL, etc. are used to communicate data over the Internet or other networks. Systems components, such as the recommendation engine and merchant website, may be implemented in a computer system, such as computer system 200.

Figure 3:
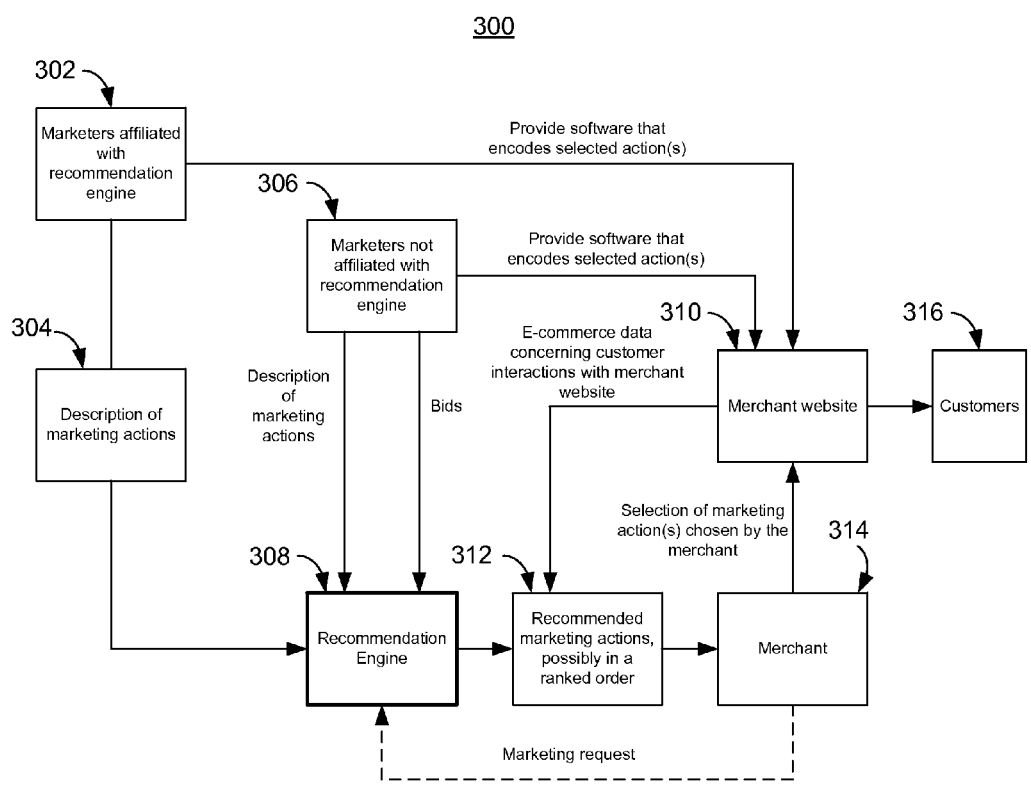
FIG. 3 illustrates components of an e-commerce system in which embodiments may be implemented.

As depicted in FIG. 3, a recommendation engine 308 interfaces marketers 302, 306 (or more generally advertisers, sales consultants, web analytic engineers, etc.) with one or more merchants 314 (although only one merchant is depicted). Two types of marketers are depicted, one type affiliated with the recommendation engine 302 and one type not affiliated with the recommendation engine 306 (hereinafter, referred to as a "third-party marketer"). Stated differently, there may be one company/organization hosting the recommendation engine that also designs marketing actions that are in turn recommended by the recommendation engine. There may also be other companies/organizations (i.e., third-party marketers) that design marketing actions, but do not host the recommendation engine. To have their marketing actions more prominently displayed to a merchant, more likely to be recommended to a merchant, more highly ranked on a list of marketing actions presented to a merchant 312, etc., third-party marketers may submit bids (or other incentives) to the recommendation engine. Such bidding process will be described in more detail below.

As depicted in FIG. 3, the recommendation engine may directly interface with the merchant website 310 and may receive e-commerce data regarding customer interactions with the merchant website.

E-commerce data may generally be categorized into "traffic side" e-commerce data and "back-end" e-commerce data. Traffic side e-commerce data may include which web pages customers look at, when they look at them, for how long, etc. Traffic side e-commerce data may also include what customers do on the merchant website (e.g., which products customers review, in what sequence, which items a customer places into a virtual shopping cart, etc.). Traffic side e-commerce data may also include whether customers returned, and if so, how long it took for them to return, as well as how many times the customers returned. Traffic side e-commerce data may include where customers came from (e.g., a referral website from which the customer was referred to the merchant website) and queries input to a search engine that eventually led the customer to the merchant website. More generally, the recommendation engine is concerned with the entire behavior of a customer at the merchant website, and any mechanism that was effective at directing a first time customer to the merchant website or a returning customer back to the merchant website.

Back end e-commerce data may include what customers ordered, who ordered it, the origin of the shipment, the destination of the shipment, and what kind of shipping (e.g., ground, express, etc.) was requested. It is noted that such information is not always available. For example, a software program may be downloaded and accordingly may not have shipping information associated therewith. Back end e-commerce data may also include a merchant's inventory (e.g., what products a store has in-stock, how the merchant's inventory changes over time, whether certain products are out-of-stock, overstocked, etc.) More generally, three important categories of e-commerce data include customer orders, products offered by the website, and website traffic.

The implementation of how to monitor customer interactions on a merchant website are well known and are not the focus of the present application. One such implementation may include storing a cookie (e.g., a binary number) in a user's web browser so that a merchant may associate a browsing history with the user. For instance, the merchant may use cookies to distinguish whether a customer is a returning customer or a first time customer. The merchant website may also store commands performed by the user (e.g., cursor-control events, keyboard events, etc.) while visiting the merchant website. The merchant may also monitor user activity even while the user is interacting with a website not affiliated with the merchant. Such monitoring may involve the use of key-logger programs and/or java scripts, which the user may opt-in to before such monitoring is allowed.

In order to make the e-commerce data easier to analyze, the recommendation engine may perform statistical analysis to condense/compact the data. For example, the recommendation engine may calculate average sales of the website per quarter, per week, per day, etc. The recommendation engine may tabulate the days in which there were spikes in the number of customers viewing the merchant website. From the condensed e-commerce data or from the original e-commerce data, the recommendation engine may identify certain characteristics of the e-commerce data, such as a purchasing behavior of the customers (e.g., most purchasing happens on Thursday nights, returning customers are more likely to make a purchase than a first time customer), or demographic attributes of the customers (e.g., most televisions are purchased by men in their forties, most perfumes are purchased by women in their twenties).

Based on the identified characteristics of the e-commerce data, human-expert heuristics may be used to automatically select one or more marketing actions to recommend to a merchant. Such heuristics may be captured in a rules database (i.e., a collection of rules which map certain characteristics of e-commerce data to one or more marketing actions).

For example, the recommendation engine may recognize from the e-commerce data that few customers return, but those that do return are much more likely to make a purchase as compared to first time customers. In fact, the inventors have observed this characteristic quite frequently for merchant websites that sell expensive items, such as jewelry and real estate. In response to this identified characteristic of the e-commerce data, the recommendation engine may recommend a marketing action (e.g., software application) that specifically targets returning customers (i.e., also called retargeting). For example, the retargeting marketing action could provide discounted prices, provide greater product description and/or provide more in depth product comparison to returning customers. The retargeting marketing action could also show customers the products/items that they browsed in their previous visit(s) to the merchant website.

Other identified characteristics of the e-commerce data may include traffic spikes. For example, a merchant website selling flowers may experience a spike in web traffic before Valentine's Day and Mother's Day. As another example, some merchants may experience traffic spikes on Wednesdays or on weekends. In response to such a characteristic of the e-commerce data (i.e., traffic spikes), the recommendation engine may recommend a quick chat application to the merchant, such application allowing customers to directly ask questions (e.g., input questions using a keyboard, tablet, smart phone, voice recognition software, etc.) to employees of the merchant website, who can then provide immediate responses to the questions.

Other identified characteristics of the e-commerce data may include keywords input to a search engine that led to customers to select a link or an advertisement (e.g., banner ad) to the merchant website. In response to such a characteristic of the e-commerce data, the recommendation engine may recommend a merchant to bid on those keywords so as to increase similar customer traffic. More specifically, the recommendation engine may recommend a marketing action, encoded in a software application, that increases the frequency or price of a merchant's bids for those words in Adwords™ (i.e., Adwords being a program offered by Google of Mountain View, Calif. that allows merchants to bid on words which, when input by potential customers on the Google search engine, result in the merchant's advisement(s) being displayed next to the search results or as sponsored results).

In short, the recommendation engine categorizes what is happening at a merchant store (e.g., on multiple axes such as products offered by the merchant website, customer orders and website traffic) and maps that categorization to one or more recommended marketing actions via a human-expert heuristic based rule. If multiple characteristics of the e-commerce data are identified, the recommendation engine may provide one or more marketing actions in response to each characteristic.

As depicted in FIG. 3, in response to the e-commerce data, bids associated with third-party marketing actions and other data, the recommendation engine may recommend one or more marketing actions to the merchant. The recommendation engine may recommend a single marketing action at one time, (e.g., recommending the highest ranked action first and the lowest ranked action last in a sequence of recommendations). Alternatively, the recommendation engine may recommend multiple marketing actions at one time, in which case the marketing actions may be presented in a ranked-list. In one embodiment, the recommended marketing actions could be provided to the merchant along with certain promotions or offers. For instance, as a reward for purchasing a marketing application from Marketer A, the merchant may be offered a 50% discount on future marketing applications purchased from Marketer A.

There may be several communication channels for the recommendation engine to transmit recommended marketing actions to a merchant. The recommendation engine may send an email to the merchant listing recommended marketing actions in a ranked order. Further, while the merchant is interacting with a marketing application, the merchant may be recommended (via banner ads, etc.) to install further marketing applications.

Regardless of the exact presentation of recommended actions, the ranking of marketing actions may be determined as follows. The rank assigned to a marketing action may be based on a quality score indicating the estimated effectiveness of the marketing action. Such estimated effectiveness may be based on the average effectiveness (e.g., measured in terms of increased sales per advertising dollar, etc.) of the marketing action for similar merchants.

The rank may also be based on a bid provided by a third-party marketer. For instance, a marketing action originally ranked fourth may be increased in rank to second due to a bid from a third-party marketer. The price of a bid may be determined by other bids, by the desired increased in rank, as well as by the quality score. For example, the price of a bid to increase the ranking to first place will be lower for a marketing action with a higher quality score than a marketing action with a lower quality score. The rank of a marketing action may not be increased indefinitely with increasing bid price. There may be a quality score threshold, below which marketing actions are not recommended, regardless of their respective bid price. If this were not so, the recommendation engine would lose credibility when recommending marketing actions that were clearly not relevant.

In addition to providing a relative ranking of the marketing actions, the recommendation engine may provide the merchant with a numerical score associated with each marketing action, indicating the estimated effectiveness of the marketing action. The numerical score may be identical to the quality score, or it may be the quality scored weighted by the third-party bid price. In addition to the rank and numerical score, the recommendation engine may also provide the merchant with the aspect(s) of the e-commerce data the recommendation is based on (e.g., traffic spikes, inventory, etc.). Further, the recommendation engine may provide the merchant with an explanation of why the marketing action was recommended. In the instance that the marketing action of discounting prices on Fridays is recommended, the recommendation engine may explain to the merchant that his/her customer traffic peaks on Fridays and discounting prices during customer peaks has led to increased sales for similar merchants.

Further, the recommended marketing actions may be categorized into categorizes, such as search engine marketing applications, retargeting applications, etc. In other words, recommended applications may be categorized based on their functionality. Therefore, if multiple marketers were to provide an application that provides search engine marketing, these marketers could be competing against each other (e.g., if only one search engine marketing application were to be recommended, then all of these marketers would be competing against each other for their search engine marketing application to be recommended to a merchant). Accordingly, marketers might place bids within a certain category of application. If a marketer's application is better (e.g., has higher quality score) within that category, that application essentially receives a "handicap" within that category. If multiple applications are categorized into one category, the recommendation engine could also recommend multiple applications, but may present the applications in ranked-list.

As depicted in FIG. 3, in response to recommended marketing actions, the merchant may choose one or more of the marketing actions. Upon selecting one or more of the recommended marketing actions, software encoding for the selected marketing action(s) may be transmitted from a marketer to the merchant website (or more precisely, to a server hosting the merchant website). The software may then be installed on the merchant website.

Following the installation of software encoding a marketing action on a merchant website, the software may monitor certain key metrics of the merchant website (e.g., customer traffic, product orders, etc.) over a certain duration of time or indefinitely. Such metrics may be reported to the merchant so the merchant may evaluate the effectiveness (or ineffectiveness) of a marketing action. Such metrics may be also provided to the recommendation engine so that the recommendation engine may adjust the future quality score associated with that (or similar) marketing action(s).

In one embodiment, the recommendation engine periodically recommends marketing actions to the merchant, without the merchant explicitly requesting for same. In another embodiment, the merchant may also submit an explicit marketing request to the recommendation engine. For example, the merchant may request the recommendation engine to provide marketing actions (or more specifically software applications) that can help the merchant increase customer traffic, increase brand recognition, increase profits, increase customer loyalty, increase the number of returning customers, increase advertisement click-through rates, etc. The recommended marketing actions returned in response to the marketing request may be based solely on the marketing request of the merchant, or may be based on both an analysis of the e-commerce data and the marketing request.

If there is a discrepancy between the marketing needs determined by the recommendation engine based on the e-commerce data and the marketing request received from the customer, the recommendation engine may directly inform the customer as to this discrepancy. For example, the merchant may request changes be made to his/her website to increase customer traffic. In response, the recommendation engine may inform the customer that customer traffic is not actually a concern, but the actual concern is to increase the number of customers, of those who already visit the website, who make a purchase.

In another embodiment, both marketing actions recommended in response to an analysis of the e-commerce data and marketing actions recommended in response to an explicit marketing request of the merchant may be provided to the merchant. In some embodiments, the latter marketing actions may receive higher rank than the former, and in other embodiments, the former marketing actions may receive higher rank than the latter.

Figure 3A:
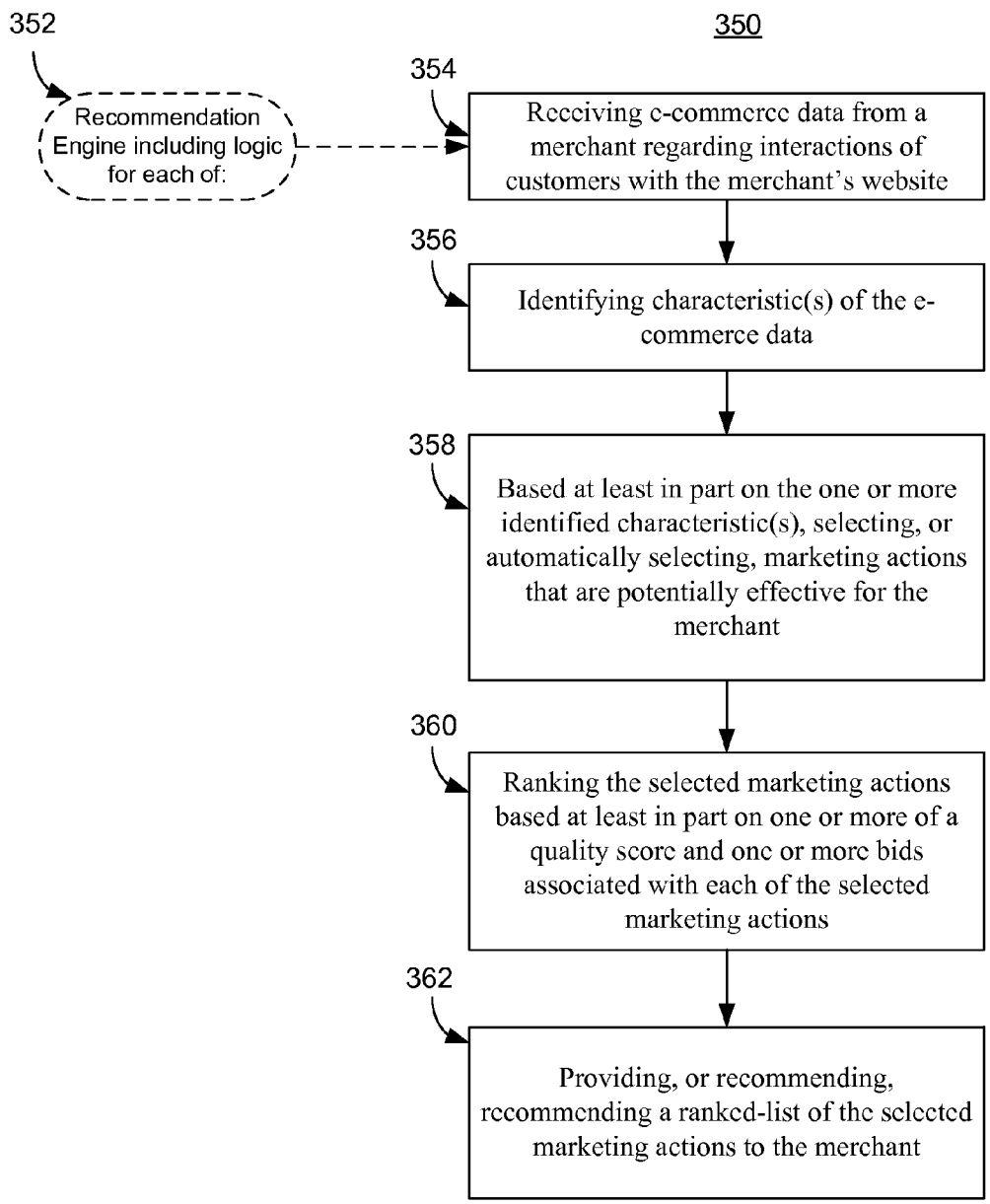
FIG. 3A illustrates a recommendation engine in which embodiments may be implemented.

FIG. 3A depicts a recommendation engine 352, according to one embodiment, which may, for example, be stored on non-transitory computer readable storage medium or media tangibly storing computer program logic capable of being executed by a computer processor. The recommendation engine 350 includes various logic or program logic for implementing aspects of some embodiments, including the depicted method 350, and each of its steps 354-362. Specifically, at step 354, e-commerce data is received from a merchant regarding interactions of customers with the merchant's website. Next, at step 356, characteristic(s) are identified of the e-commerce data. Next, at step 358, based at least in part on the one or more identified characteristic(s), marketing actions are selected, or automatically selected, that are potentially effective for the merchant.

In some embodiments, selection of marketing actions, or advertisements, that are potentially effective for the merchant may be accomplished by use of a rules database, or otherwise. In some embodiments, potentially effective marketing actions may include marketing actions that are statistically or heuristically predicted to lead to an increase in the size or diversity of an advertising audience, an increase in the frequency with which an advertising audience receives or acts upon advertisements, or otherwise lead directly or indirectly to increased revenue.

Next, at block 360 represents ranking the selected marketing actions are ranked based at least in part on one or more of a quality score and one or more bids associated with each of the selected marketing actions. Lastly, as depicted, at step 362, a ranked-list of the selected marketing actions is provided, or recommended, to the merchant.

It is to be noted that, in some embodiments, ranking may not be performed, and one or more marketing actions may be selected and provided or recommended to the merchant without ranking.

In the following description, FIGS. 4-8 provide further explanation of the processes performed by each component of the system depicted in FIG. 3.

Figure 4:
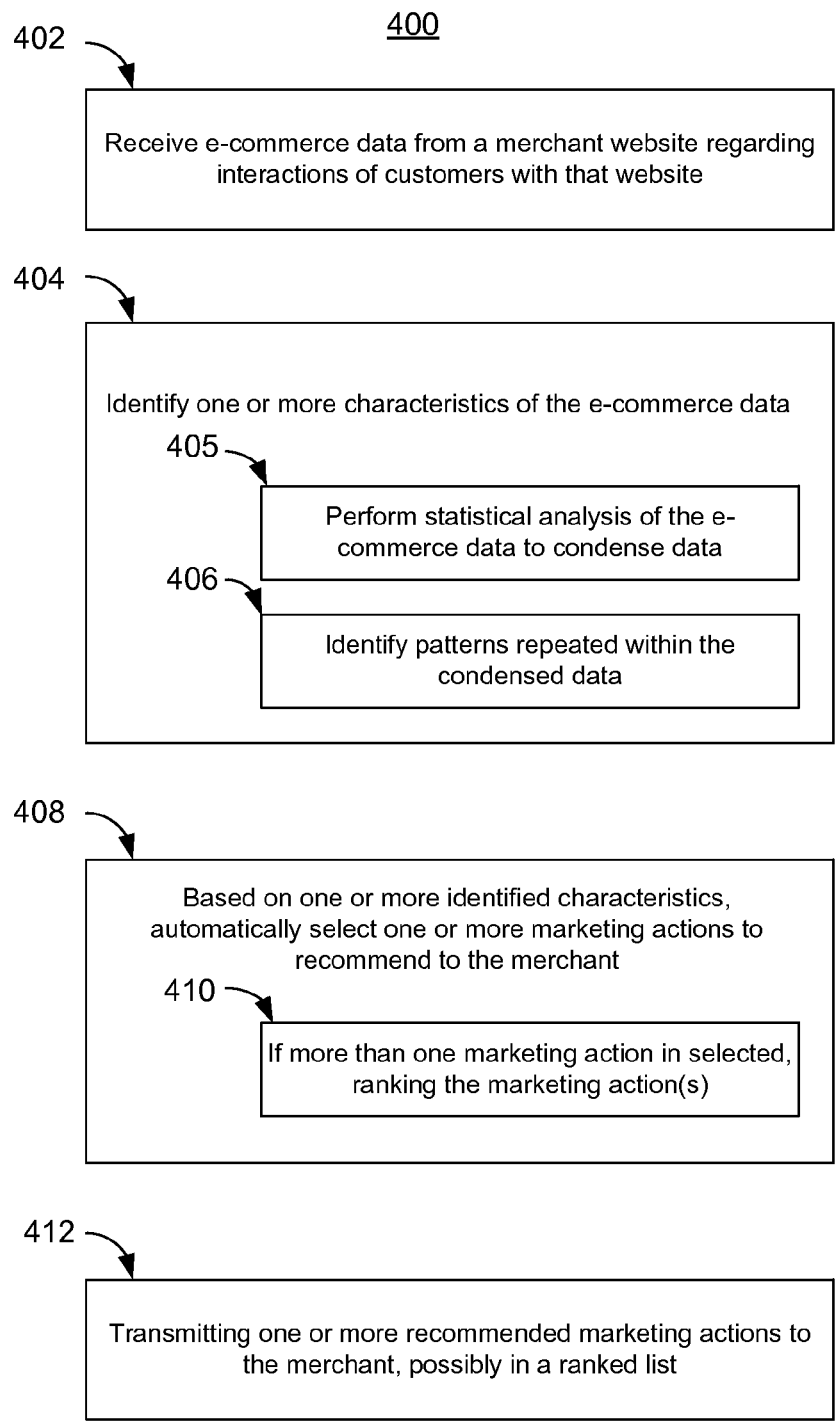
FIG. 4 depicts a flow diagram that may be performed by a recommendation engine, in accordance with one embodiment.

In accordance with one embodiment, FIG. 4 depicts the steps that may be performed by the recommendation engine. First, the recommendation engine may receive e-commerce data from a merchant website regarding interactions of customers with that website. From the e-commerce data, the recommendation engine may identify characteristics associated with the e-commerce data. Such characteristics may be identified based on patterns repeated within the e-commerce data. The characteristics may include customer behaviors, customer demographics, etc. More particularly, a statistical analysis of the e-commerce data may be first performed in order to condense the e-commerce data. Subsequently, patterns may be identified from the condensed data, as well as from the original e-commerce data.

Based on the identified characteristics, the recommendation engine may automatically select one or more marketing actions to recommend to the merchant. If more than one marketing action is selected, the marketing actions may further be ranked. Finally, the recommendation engine transmits one or more of the recommended marketing actions to the merchant, possibly in a ranked-order.

As mentioned above, the recommendation engine may receive an explicit marketing request from a merchant, and the recommended marketing actions may be based on the explicit marketing request, in addition to the e-commerce data.

Figure 5:
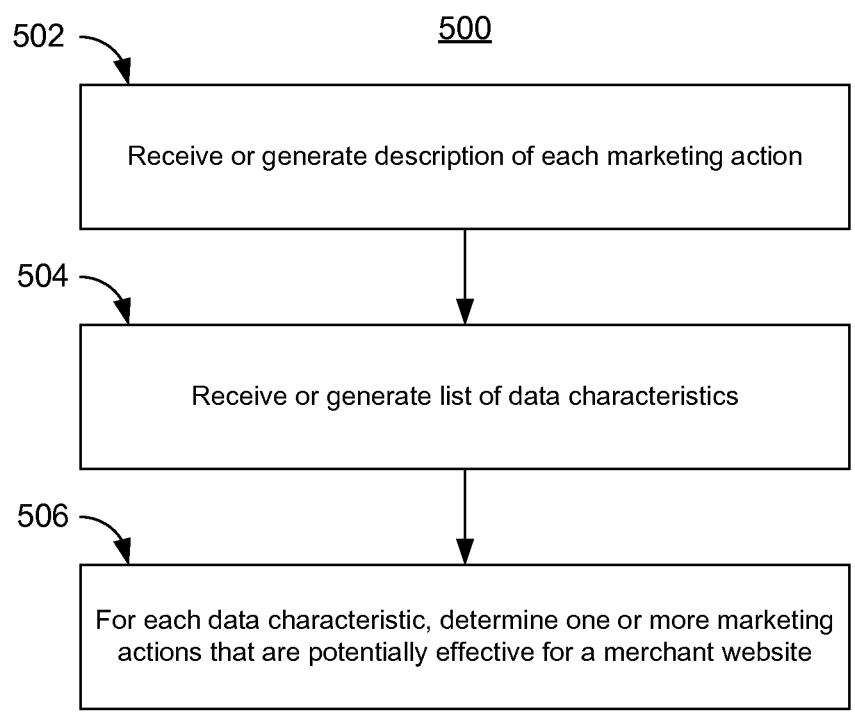
FIG. 5 depicts a flow diagram containing steps that may be performed in the generation of a rules database, in accordance with one embodiment.

In accordance with one embodiment, FIG. 5 depicts the steps associated with the generation of the rules database, which maps characteristics of the e-commerce data to marketing applications. First, the recommendation engine may receive and/or may generate a description of each marketing action (see e.g., step 304 of FIG. 3). The following includes example marketing applications from Lexity and their associated description:

Lexity Live: Keep a finger on the pulse of your business. See your customers browse, check out, and buy in real time!
    Live Archive: Analyze your site traffic over time. Track page-by-page activity of your top customers.
    MailChimpROI: Analyze revenue data over time from your MailChimp email campaigns.
    Pinterest Report: Track your most pinned products, competitive landscape, and influential pinners on Pinterest.
    Quick Chat: Chat instantly with any visitor on your website, and see exactly what they are seeing and doing.
    eCommHub: Automate inventory management and order processing with drop-shippers, fulfillment centers, and other vendors!
    Shopping Feeds: Get your products automatically listed on comparison shopping engines including Google, Bing, and TheFind.
    MixRank: MixRank reveals your competitors campaigns showing you exactly what's working for them.
    Google Shopping: Get your products listed on Google Shopping, Google's new paid listings replacing Google Product Search.
    Retargeting: Recover lost sales by showing retargeting display ads to visitors who haven't yet bought.

Next, the recommendation engine may receive and/or generate a list of e-commerce data characteristics:
    Many first time customers
    Few returning customers
    Many impulse shoppers
    Many window shoppers
    Few bargain shoppers
    Many last minute shoppers
    Many men in their forties visiting merchant site Many women in their twenties visiting merchant site Finally, for each e-commerce data characteristic, the recommendation engine may determine one or more marketing actions that are potentially effective for a merchant website. Such determination may be based on heuristics, empirical studies, etc. A collection of exemplary rules is depicted in a table in FIG. 6.

Figure 7:
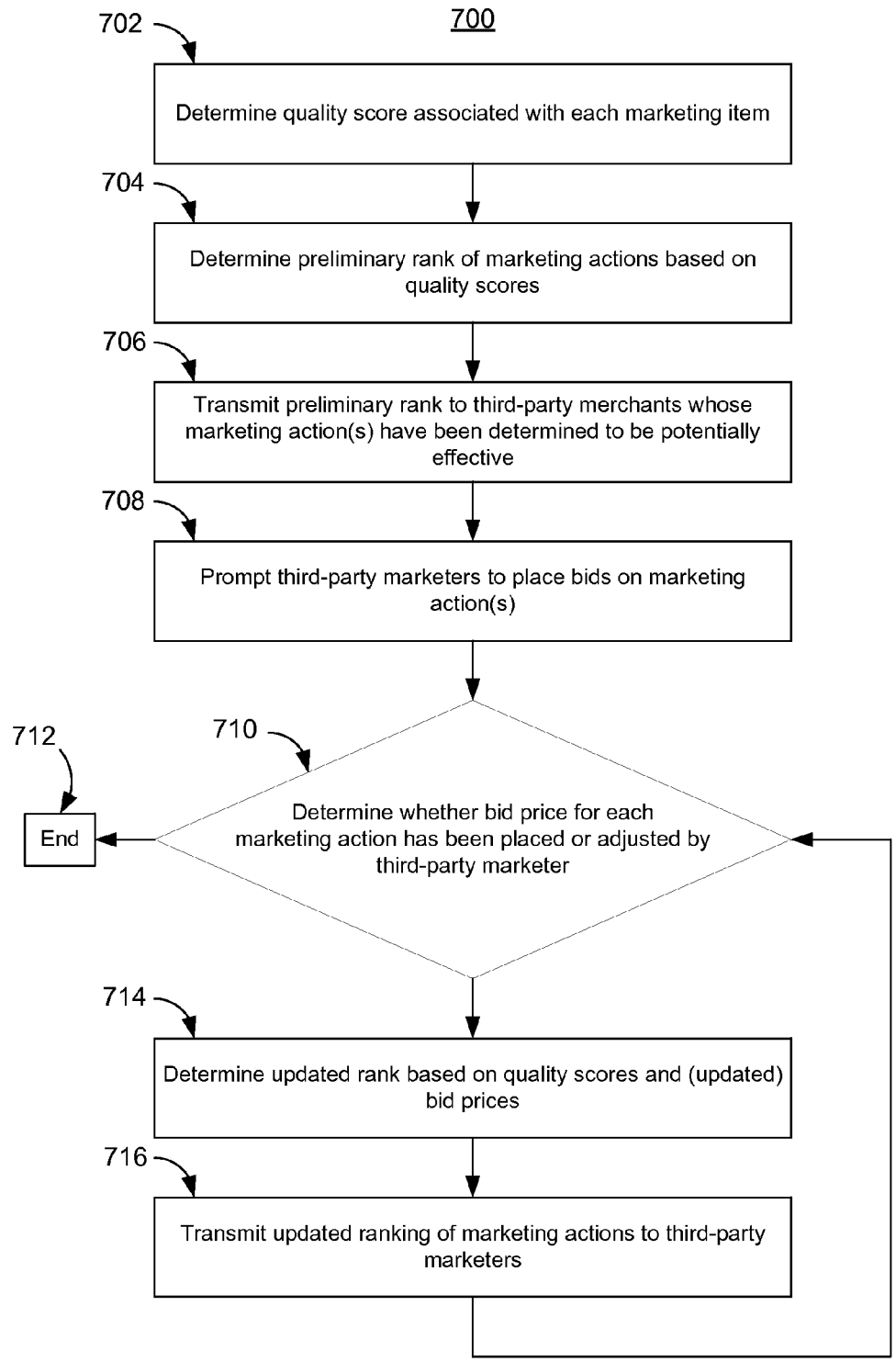
FIG. 7 depicts a flow diagram that may be performed by a recommendation engine in order to rank marketing actions, in accordance with one embodiment.

In accordance with one embodiment, FIG. 7 depicts the steps that may be associated with the ranking of the marketing actions, once a subset of marketing actions has been determined to be potentially effective through application of the rules database. First, the recommendation engine may determine a quality score associated with each marketing action, indicating the potential effectiveness of the marketing action for the merchant. Such quality score may be solely based on a determined characteristic of the e-commerce data and the particular marketing action. For example, if the e-commerce data characteristic is "few returning customers" and the app is Retargeting, the quality score may be 90 (with 0 being the lowest quality score and 100 being the highest quality score). Alternatively, the quality score may also be a function of the actual e-commerce data, and may be adjusted from a default value given for a particular combination of e-commerce data characteristic and marketing action. Additionally, the quality score may be determined from heuristics, empirical studies, etc.

Next, the recommendation engine may generate a preliminary ranking of the marketing actions based on the quality scores and may transmit the preliminary ranking to the third-party marketers whose marketing action(s) have been determined as potentially effective. The recommendation engine may prompt the third-party marketers (if there are any) to place bids so as to increase the ranking of their respective marketing actions. If no bids are received, the preliminary ranking is the final ranking and the ranking procedure concludes. Otherwise, if bids are received, the recommendation engine may generate an updated rank of the marketing actions based on the quality scores and the third-party marketers' bids. The updated ranks may be provided to the third-party marketers, and the third-party marketers may be prompted to change (e.g., increase, decrease) their bids. If some third-party marketers do decide to change their bids, updated ranks are generated as previously described. Otherwise, the ranking process concludes.

In addition, if the recommendation engine has received an explicit marketing request from the merchant, the ranking may additionally be based on how closely the recommended marketing action addresses the explicit marketing request.

In one embodiment, a metric used to rank marketing actions (i.e., rank metric in short) may be determined based on the following product of the quality score and the bid price: (quality score)*(1+bid price). Such products may be calculated for each recommended marketing action, and the marketing actions may be ranked (from lowest rank to highest rank) based on increasing product values. In another embodiment, a rank metric may be determined based on the following summation of the quality score and the bid price: quality score+bid price. Such sums may be calculated for each recommended marketing action and its corresponding bid, and the marketing actions may be ranked (from lowest rank to highest rank) based on increasing summation values. (Such mathematical formulas have been provided as examples and other mathematical formulas may also be used.)

As discussed earlier, marketing actions with a quality score below a certain value may not be recommended, regardless of the bid price. For purposes of discussion, suppose quality scores range from 0 to 100, with 0 indicating lowest quality and 100 indicating highest quality. Further suppose in one implementation that the recommendation engine does not recommend a marketing action with a quality score below 20. The rank metric (calculated via a product) of a marketing action may be modified as follows: (quality score)*u(quality score−20)*(1+bid price), where $u(x)$ is the unit step function defined as $u(x)=1$ for $x \geq 0$, and $u(x)=0$ for $x<0$. The rank metric (calculated via a summation) of a marketing action may be modified as follows: (quality score+bid price)*u(quality score−20), where $u(x)$ is once again the unit step function. (Such mathematical formulas have been provided as examples and other mathematical formulas may also be used.)

Figure 8:
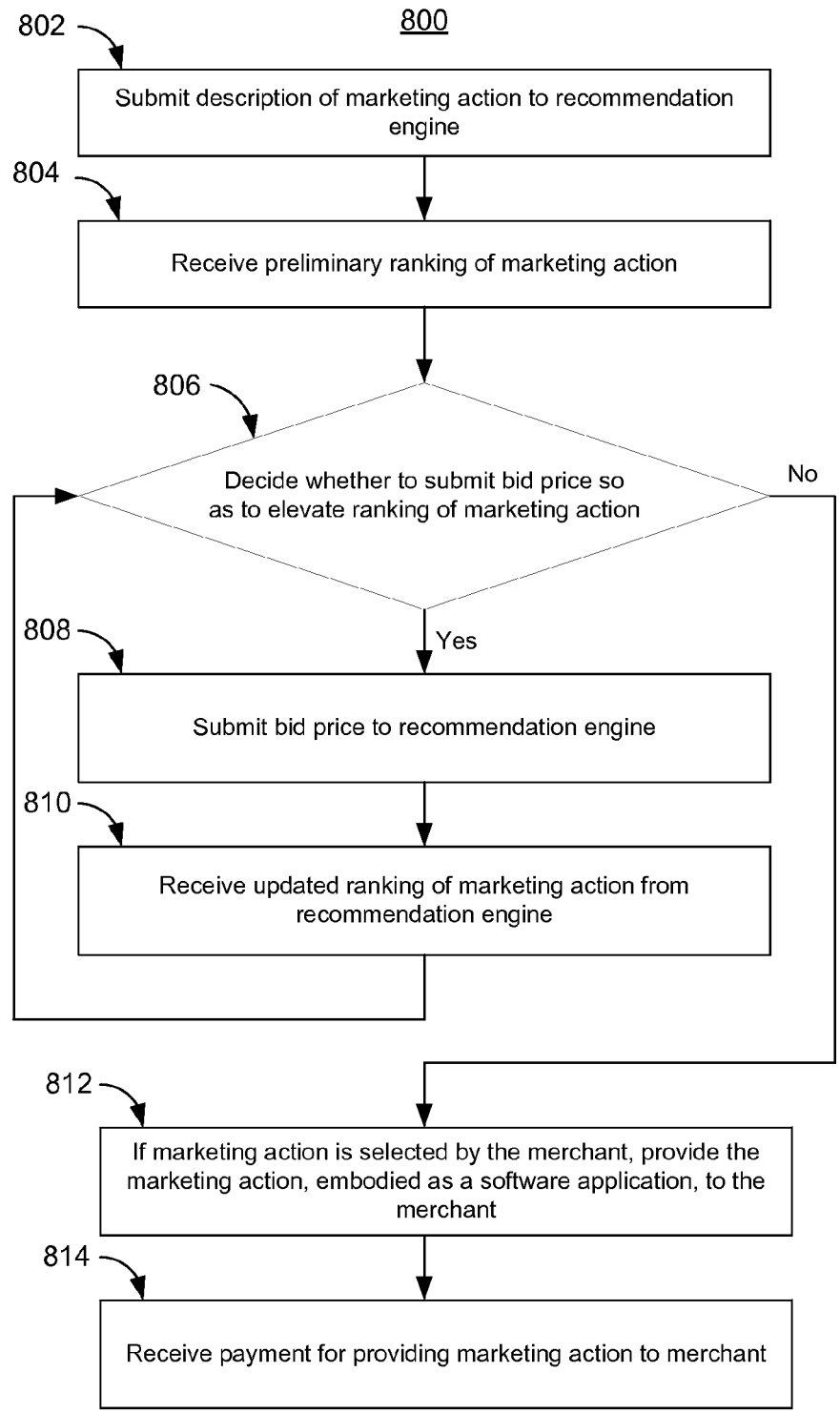
FIG. 8 depicts a flow diagram that may be performed by a third-party marketer in order to distribute (e.g., sell) marketing services to a merchant, in accordance with one embodiment.

In accordance with one embodiment, FIG. 8 depicts steps that may be performed by a third-party marketer. First, the third-party marketer may submit, to the recommendation engine, a description of each marketing action he/she desires to distribute (e.g., sell) to merchants. Upon the third-party marketer's marketing action being determined to be potentially effective for a merchant, the third-party marketer may be informed of the preliminary ranking of his/her marketing action. The third-party marketer then decides whether to submit a bid price so as to elevate the ranking of his/her marketing action. If so, the marketer submits a bid price to the recommendation engine and receives an updated ranking of his/her marketing action from the recommendation engine. Alternatively, the third-party marketer may submit a desired rank position, and the recommendation engine may inform the third-party marketer the corresponding payment necessary to elevate the ranking of the marketing action to the desired ranking. If not (i.e., marketer declines the opportunity to influence the ranking of his/her marketing action), the marketer waits to see whether a merchant selects his/her marketing action.

If a merchant selects the third-party marketer's marketing action, the third-party marketer may provide the marketing action, encoded as a software application, to the merchant. Finally, the third-party marketer may receive payment for providing the marketing action to the merchant. At some point in the process, the third-party marketer may also pay the entity/organization hosting the recommendation engine an amount equal to the bid price (not depicted). While the description above has described only one marketing action associated with the third-party marketer for conciseness, it should be clear how to generalize the process to handle instances where the third-party marketer attempts to distribute two or more marketing actions.

Figure 9:
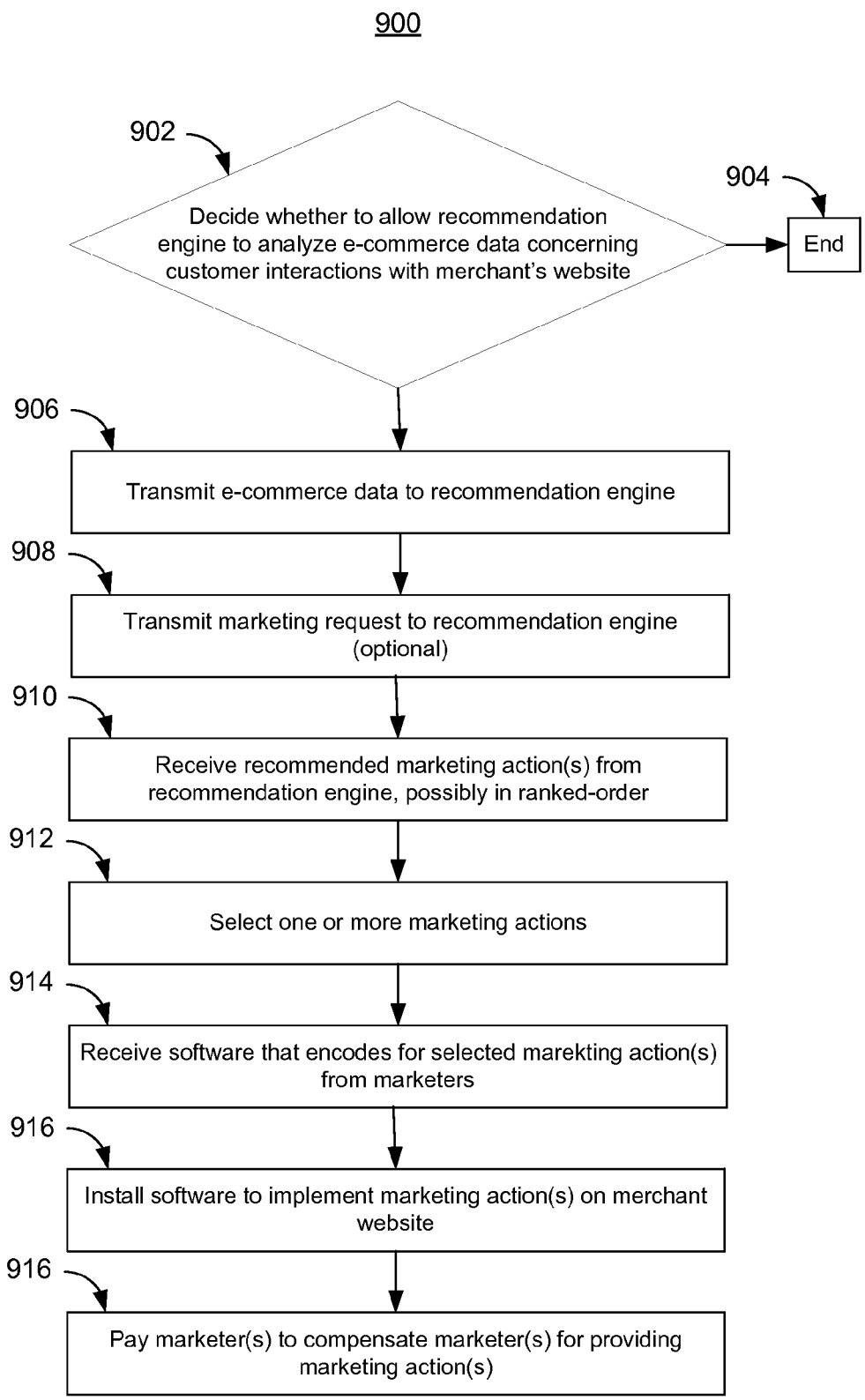
FIG. 9 depicts a flow diagram that may be performed by a merchant in order to receive (e.g., buy) marketing services from a marketer, in accordance with one embodiment.

In accordance with one embodiment, FIG. 9 depicts steps that may be performed by a merchant. First, a merchant may decide whether or not to allow the recommendation engine to analyze e-commerce data concerning customer interactions with the merchant's website. If the merchant agrees, the e-commerce data is sent from the merchant website (or more specifically, from a server hosting the merchant website) to the recommendation engine. Otherwise (i.e., merchant does not agree), the process ends. Optionally, a merchant may provide an explicit marketing request to the recommendation engine. The merchant may then receive, from the recommendation engine, one or more marketing actions that are expected to improve the marketing capabilities of the merchant website. The merchant may select one or more of the recommended marketing actions. The merchant may then receive one or more marketing actions (e.g., encoded as software applications) from a marketer (either a third-party marketer or a marketer affiliated with the recommendation engine). Alternatively, the marketing action(s) may be received from the recommendation engine, if the recommendation engine has access to a database that stores the selected marketing action(s). The merchant may install the received software to implement the selected marketing action(s) on the merchant website. If a selected marketing action has an associated price, the merchant may additionally send payment to the marketer to compensate the marketer for providing the marketing action.

As should be apparent from the foregoing discussion, various embodiments may be implemented with the aid of computer-implemented processes or methods (i.e., computer programs or routines) or on any programmable or dedicated hardware implementing digital logic. Such processes may be rendered in any computer language including, without limitation, a object oriented programming language, assembly language, markup languages, and the like, as well as object-oriented environments such as the Common Object Request Broker Architecture (CORBA), Java™ and the like, or on any programmable logic hardware like CPLD, FPGA and the like.

It should also be appreciated that the portions of this detailed description that are presented in terms of computer-implemented processes and symbolic representations of operations on data within a computer memory are in fact the preferred means used by those skilled in the computer science arts to most effectively convey the substance of their work to others skilled in the art. In all instances, the processes performed by the computer system are those requiring physical manipulations of physical quantities. The computer-implemented processes are usually, though not necessarily, embodied the form of electrical or magnetic information (e.g., bits) that is stored (e.g., on computer-readable storage media), transferred (e.g., via wired or wireless communication links), combined, compared and otherwise manipulated. It has proven convenient at times, principally for reasons of common usage, to refer to these signals as bits, values, elements, symbols, keys, numbers or the like. It should be borne in mind, however, that all of these and similar terms are to be associated with the appropriate physical quantities and are merely convenient labels applied to these quantities.

Unless specifically stated otherwise, it should be appreciated that the use of terms such as processing, computing, calculating, determining, displaying or the like, refer to the action and processes of a computer system, or similar electronic computing device, that manipulates and transforms data represented as physical (electronic) quantities within the computer system's registers, memories and other storage media into other data similarly represented as physical quantities within the computer system memories, registers or other storage media. Embodiments can be implemented with apparatus to perform the operations described herein. Such apparatus may be specially constructed for the required purposes, or may be appropriately programmed, or selectively activated or reconfigured by a computer-readable instructions stored in or on computer-readable storage media (such as, but not limited to, any type of disk including floppy disks, optical disks, hard disks, CD-ROMs, and magnetic-optical disks, or read-only memories (ROMs), random access memories (RAMs), erasable ROMs (EPROMs), electrically erasable ROMs (EEPROMs), magnetic or optical cards, or any type of media suitable for storing computer-readable instructions) to perform the operations. Of course, the processes presented herein are not restricted to implementation through computer-readable instructions and can be implemented in appropriate circuitry, such as that instantiated in an application specific integrated circuit (ASIC), a programmed field programmable gate array (FPGA), or the like.

It should be appreciated that the embodiments described above are cited by way of example, and that embodiments not limited to what has been particularly shown and described hereinabove. Rather, embodiments include both combinations and sub-combinations of the various features described hereinabove, as well as variations and modifications thereof which would occur to persons skilled in the art upon reading the foregoing description and which are not disclosed in the prior art.

The invention claimed is:

1. A system comprising one or more processors and a non-transitory storage medium comprising program logic for execution by the one or more processors, the program logic comprising:
 a recommendation engine that:
  receives e-commerce data from a merchant regarding interactions of customers with a website of the merchant;
  identifies one or more characteristics of the e-commerce data, the one or more characteristics of the e-commerce data comprising a keyword input into a search engine by the customers, search results of the search engine generated as a result of the keyword input into the search engine comprising a link or an advertisement to the website of the merchant, the link or the advertisement to the website of the merchant selected by the customers;
  based at least in part on the one or more identified characteristics, automatically selects a plurality of marketing actions that are potentially effective for the merchant;
  ranks the selected marketing actions based at least in part on one or more of a quality score and one or more bids associated with each of the selected marketing actions, the ranking of the selected marketing actions determined based on the equation (the quality score+a price of the one or more bids)*u(the quality score−a predetermined quality score threshold), where u(x) is a unit step function;
  provides, to the merchant, a ranked list of the selected marketing actions;
  based on a selection of one or more of the selected marketing actions by the merchant, transmit a software encoded for the selected marketing action to the website of the merchant;
  install the software encoded for the selected marketing action to the website of the merchant; and
  using the software to monitor key metrics of the website of the merchant, adjust the quality score based on the monitored key metrics.

2. The system of claim 1, wherein the recommendation engine ranks the selected marketing actions based at least in part on a quality score and one or more bids associated with each of the selected marketing actions.

3. The system of claim 1, wherein the one or more bids comprise a plurality of bids from a plurality of third party marketers.

4. The system of claim 1, wherein the bids are bids for positions associated with marketing actions.

5. The system of claim 1, wherein a quality score indicates an estimated effectiveness of a marketing action.

6. The system of claim 1, wherein the e-commerce data comprises data that is accumulated in the operation of an e-commerce store, and comprises order data, website traffic data, and e-commerce store product data.

7. The system of claim 1, wherein ranking of a first marketing action is based at least in part on estimated profit to the merchant from the first marketing action.

8. The system of claim 1, wherein the identified characteristics include purchasing behavior of customers and demographic attributes of the customers.

9. The system of claim 1, wherein providing the ranked list of selected marketing actions comprises recommending marketing actions.

10. The system of claim 1, wherein providing the ranked list of selected marketing actions comprises recommending marketing actions based at least in part on human-expert heuristics captured in one or more rules databases.

11. A method for recommending marketing actions, the method comprising:
    receiving e-commerce data from a merchant regarding interactions of customers with a website of the merchant;
    identifying one or more characteristics of the e-commerce data, the one or more characteristics of the e-commerce data comprising a keyword input into a search engine by the customers, search results of the search engine generated as a result of the keyword input into the search engine comprising a link or an advertisement to the website of the merchant, the link or the advertisement to the website of the merchant selected by the customers;
    based at least in part on the one or more identified characteristics, automatically selecting a plurality of marketing actions that are potentially effective for the merchant;
    ranking the selected marketing actions based at least in part on one or more of a quality score and one or more bids associated with each of the selected marketing actions, the ranking of the selected marketing actions determined based on the equation (the quality score+a price of the one or more bids)*u(the quality score−a predetermined quality score threshold), where u(x) is a unit step function;
    recommending a ranked-list of the selected marketing actions to the merchant;
    based on a selection of one or more of the selected marketing actions by the merchant, transmitting a software encoded for the selected marketing action to the website of the merchant;
    installing the software encoded for the selected marketing action to the website of the merchant; and
    using the software to monitor key metrics of the website of the merchant, adjusting the quality score based on the monitored key metrics.

12. The method of claim 11, comprising the recommendation engine ranking the selected marketing actions based at least in part on a quality score and one or more bids associated with each of the selected marketing actions.

13. The method of claim 11, comprising receiving the one or more bids, wherein the one or more bids comprise a plurality of bids from a plurality of third party marketers.

14. The method of claim 11, comprising receiving the one or more bids, wherein the bids are bids for positions associated with marketing actions.

15. The method of claim 11, comprising utilizing a quality score that indicates an estimated effectiveness of a marketing action.

16. The method of claim 11, comprising utilizing a quality score that indicates an estimated effectiveness of a first marketing action based at least in part on an average effectiveness of the marketing action for similar merchants to a merchant associated with the first marketing action.

17. The method of claim 11, comprising utilizing the e-commerce data that is accumulated in the operation of an e-commerce store, and comprises order data, website traffic data, and e-commerce store product data.

18. The method of claim 11, comprising ranking of a first marketing action based at least in part on estimated profit to the merchant from the first marketing action.

19. A non-transitory computer readable storage medium tangibly storing computer program logic capable of being executed by a computer processor, the program logic comprising a recommendation engine for:
    receiving e-commerce data from a merchant regarding interactions of customers with a website of the merchant;
    identifying one or more characteristics of the e-commerce data, the one or more characteristics of the e-commerce data comprising a keyword input into a search engine by the customers, search results of the search engine generated as a result of the keyword input into the search engine comprising a link or an advertisement to the website of the merchant, the link or the advertisement to the website of the merchant selected by the customers;
    based at least in part on the one or more identified characteristics, automatically selecting a plurality of marketing actions that are potentially effective for the merchant;
    ranking the selected marketing actions based at least in part on one or more of a quality score and one or more bids associated with each of the selected marketing actions, the ranking of the selected marketing actions determined based on the equation (the quality score+a price of the one or more bids)*u(the quality score−a predetermined quality score threshold), where u(x) is a unit step function;
    providing a ranked-list of the selected marketing actions to the merchant;
    based on a selection of one or more of the selected marketing actions by the merchant, transmitting a software encoded for the selected marketing action to the website of the merchant;
    installing the software encoded for the selected marketing action to the website of the merchant; and
    using the software to monitor key metrics of the website of the merchant, adjusting the quality score based on the monitored key metrics.

20. The system of claim 1, wherein the predetermined quality score threshold is 20.

21. The method of claim 11, wherein the predetermined quality score threshold is 20.

22. The non-transitory computer readable storage medium of claim 19, wherein the predetermined quality score threshold is 20.

* * * * *